United States Patent
Eitel et al.

(10) Patent No.: US 7,386,735 B2
(45) Date of Patent: Jun. 10, 2008

(54) METHOD FOR SECURING THE AUTHENTICITY OF HARDWARE AND SOFTWARE IN A NETWORKED SYSTEM

(75) Inventors: Peter Eitel, Brunnthal (DE); Guido Heidt, Landsberg/Lech (DE); Uwe Retzow, München (DE)

(73) Assignee: Siemens AG, Munich (DE)

( * ) Notice: Subject to any disclaimer, the term of this patent is extended or adjusted under 35 U.S.C. 154(b) by 597 days.

(21) Appl. No.: 10/219,602

(22) Filed: Aug. 15, 2002

(65) Prior Publication Data
US 2003/0079141 A1    Apr. 24, 2003

Related U.S. Application Data

(63) Continuation of application No. PCT/EP01/01055, filed on Feb. 1, 2001.

(30) Foreign Application Priority Data
Feb. 15, 2000   (EP)  ................. 00103075

(51) Int. Cl.
*G06F 11/30*   (2006.01)
*G06F 12/14*   (2006.01)
*H04L 9/32*    (2006.01)

(52) U.S. Cl. ............... 713/194; 726/1; 726/2; 726/22; 726/26; 726/34

(58) Field of Classification Search ................. 713/194
See application file for complete search history.

(56) References Cited

U.S. PATENT DOCUMENTS

| 4,723,284 A | 2/1988 | Munck et al. |
| 5,742,512 A | 4/1998 | Edge et al. |
| 6,226,749 B1 * | 5/2001 | Carloganu et al. ............. 726/2 |

OTHER PUBLICATIONS

Walter Fumy et al.: "Kryptographie" [cryptography], *R. Oldenbourg Verlag*, Munchen, 1988, pp. 247-267, 287-291.

* cited by examiner

*Primary Examiner*—Nasser Moazzami
*Assistant Examiner*—Chinwendu C Okoronkwo
(74) *Attorney, Agent, or Firm*—Laurence A. Greenberg; Werner H. Stemer; Ralph E. Locher

(57) ABSTRACT

The invention relates to a method for securing a networked system comprising system components having hardware and software modules connected via a system bus. According to the invention, the system components each comprise an authentication feature for the hardware modules and/or a further authentication and/or integrity securing feature each for the software modules. Further, a central testing module attached to the system bus for testing the authenticity features and/or the integrity securing features is provided.

10 Claims, 1 Drawing Sheet

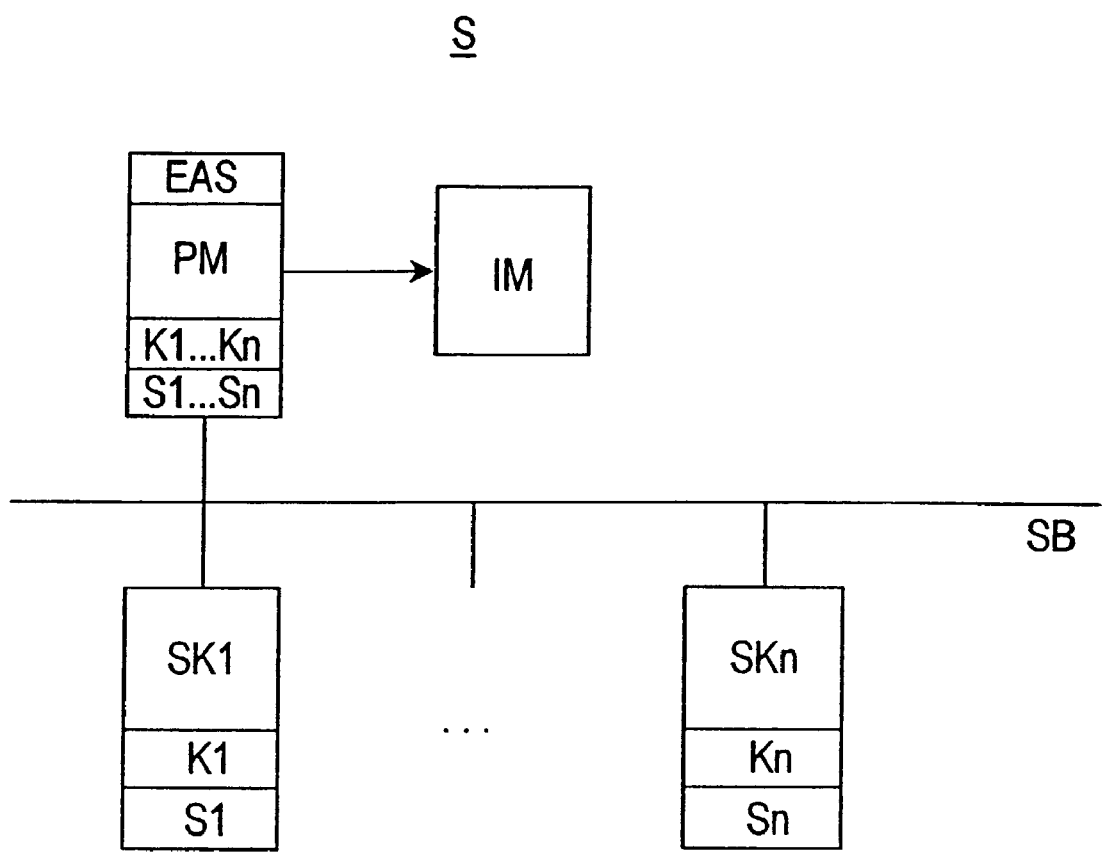

METHOD FOR SECURING THE AUTHENTICITY OF HARDWARE AND SOFTWARE IN A NETWORKED SYSTEM

CROSS-REFERENCE TO RELATED APPLICATION:

This is a continuing application, under 35 U.S.C. §120, of copending international application No. PCT/EP01/01055, filed Feb. 1, 2001, which designated the United States; this application also claims the priority, under 35 U.S.C. §119, of European patent application No. 00 103 075.8, filed Feb. 15, 2000; the prior applications are herewith incorporated by reference in their entirety.

FIELD OF THE INVENTION

The present invention relates to a method for securing a networked system comprising system components connected to hardware modules and software modules via a system bus.

BACKGROUND OF THE INVENTION AND PRIOR ART

Such a system may for example be formed by the following scenarios:
- system for remote inquiry of electricity meter readings over the power line or the power supply network,
- database server with accesses via clients
- client/server configuration comprising internal data exchange
- remote setting of devices
- remote inquiry of account balances
- system in a vehicle having networked processors/microcontrollers, in particular motor control, alarm system or central door safety system,
- etc.

Symmetric and asymmetric encryption methods are generally known, wherein a safe message channel between communication parties is formed. Further, symmetric and asymmetric methods, like for example a digital signature or a message authentication code (MAC) are generally used, wherein the authenticity and/or integrity of a message, a party, or a key may be tested by a reception unit. General basics are for example described in the book "Kryptographie" by W. Fumy and H. P. Rieβ, "Entwurf und Analyse symmetrischer Kryptosysteme", R. Oldenburg Verlag Munchen, Wien, 1988.

SUMMARY OF THE INVENTION

It is the object of the invention to protect the above mentioned hardware and software systems against unauthorized manipulation.

In accordance with the present invention, this object is achieved by a method for securing a networked system comprising system components connected to hardware modules and software modules via a system bus, the system components each comprise an authentication feature for the hardware modules and/or a further authentication or an integrity securing feature each for the software modules, and a central testing module attached to the system bus for testing the authentication features and/or the integrity securing features is provided.

The inventive method protects the hardware and software devices of a system against unauthorized changes and/or recognizes manipulations, in particular during the effective operation.

In one embodiment of the inventive method the external access to the devices of the system is secured. This includes among others the exchange or the renewal of system components and/or hardware and software components being part of the same.

Further advantageous implementations are stated in the dependent claims.

BRIEF DESCRIPTION OF THE DRAWINGS

FIG. 1 illustrates a system comprising system components SK1 to SKn connected via system bus SB.

DETAILED DESCRIPTION OF PREFERRED EMBODIMENTS

In the following, the invention is described using an embodiment illustrated in the FIGURE.

In the single FIGURE a system S is illustrated, comprising system components SK1 to SKn connected via a system bus SB. The system components SK1 to SKn comprise hardware and software modules which are not described in detail, formed according to the specific tasks of the individual system components SK1 to SKn.

The system components SK1 to SKn are for example realized by personal computers, printers, servers, but also by devices within a motor control, like for example processors and memory devices.

According to the invention, a central testing module PM connected to the system bus SB is provided within the system S. Further, the hardware modules in the system components SK1 to SKn are provided with authentication features K1 to Kn. Analogously, the software modules of the system components SK1 to SKn comprise further authentication and/or integrity securing features S1 to Sn.

The storage of the integrity securing features S1 to Sn is optional according to the implementation of the system S.

The authentication features K1 to Kn and/or the integrity securing features S1 to Sn are preferably created at the end of the development process of the respective modules before the delivery. The authentication feature (K1 to Kn) is for example the serial number of a hardware circuit and may for example be additionally provided with a date. The integrity securing features S1 to Sn are preferably digital signatures using a public key method or symmetric authentication and/or integrity codes (MAC, Message Authentication Codes) created by a trustworthy entity.

The hardware/software devices of the respective system S are tested during effective operation. The testing may be performed by a so-called trap, i.e., upon a request of one of the system components SK1 to SKn. The testing may also be carried out by a so-called polling, i.e., upon a request by the testing module PM. The testing of the authentication features K1 to Kn or the integrity securing features S1 to Sn is in any case done centrally within the testing module PM. The testing may for example be done by powering down and/or switching off the system S but for example also in specific time intervals during operation.

When recognizing inconsistencies, the system S may for example be shut down. It is further possible to output a more or less detailed message to an information module IM. To this end, the information module IM is for example directly connected to the testing module PM.

In one embodiment of the invention the testing module PM comprises an input/output interface EAS. This interface EAS forms the only access to the system S. I.e., via this interface EAS an external access to data and functions of the system S is accomplished. Here both an authentication and a testing of the access rights of the accessing person and/or entity is carried out.

A further type of access is for example the software update of corresponding modules within the system components SK1 to SKn. In this context, again both testing of the accessing person and/or entity and determining the rights is accomplished to perform the corresponding update. Further, a first testing of the respective authentication and or the corresponding integrity securing feature (S1-Sn) of the software is accomplished. The same applies for the exchange of hardware modules in the system components SK1 to SKn.

In the following, further embodiments of the invention are described.

Thus, the data exchange in testing the authentication features K1 to Kn and the further authentication and/or integration securing features S1 to Sn between the central testing module PM and the respective system components SK1 to SKn may be secured. The securing may be accomplished by an internal digital signature or by an MAC (Message Authentication Code). Additionally, the exchanged data records may be encrypted. The cryptographic functions used within the system are independent of the cryptographic mechanisms by use of which for example the authentication features K1 to Kn and the integrity securing features S1 to Sn were created. In particular, theses mechanisms need not be implemented within the system components SK1 to SKn, and a self-sufficient key management may further be used internally. The testing module PM having a corresponding implementation may function as the key distribution centre.

In a further embodiment of the invention, the formation of the authentication features K1 to Kn of the hardware modules may also be taken over by crypto-functions within the system. In this context, the authentication features K1 to Kn are for example created by the respective system S itself in an initialising step. Also this may be performed centrally within the testing module PM.

According to the respective safety requirements both symmetric and asymmetric crypto-methods may be applied externally and internally.

The invention claimed is:

1. A networked system, comprising:
an internal system bus;
a first remotely located system component and a second remotely located system component, the first and the second system components being remotely located from each other, the first remotely located system component and the second remotely located system component each comprising a hardware and a software module and the first remotely located system component and the second remotely located system component being connected via the internal system bus;
wherein each of the first remotely located system component and the second remotely located system component stores an authentication feature for a hardware module or an integrity securing feature for a software module;
an internal central testing module attached to the internal system bus and connected to the first remotely located system component and the second remotely located system component only via the internal system bus, the internal central testing module being adapted to centrally test the authentication features and/or the integrity securing features, the central testing including a data exchange between the internal central testing module and a respective remotely located system component wherein the internal central testing module has stored the authentification features or the integrity securing features from the first remotely located system component and the second remotely located system component and wherein the internal central testing module is implemented to centrally test the authentication features or the integrity securing features stored in the first remotely located system component and the second remotely located system component by using the authentication features or the integrity securing features of each of the first and the second remotely located system components stored in the internal central testing module in response to
a request from the internal central testing module,
a request from the first remotely located system component or from the second remotely located system component,
powering down or switching off the internal system, or
in specific time intervals during operation, and
an input/output interface for accessing data and functions of the internal system from an external entity having access rights, the internal system comprising the internal system bus, the first and the second remotely located system components and the internal central testing modules,
wherein the input/output interface is implemented within the internal central testing module,
wherein the input/output interface forms the only external accessing possibility to the internal system, and
wherein the internal central testing module is further implemented in order to perform an authentication of the external entity performing an external access and a testing of the access rights of the external entity performing an external access to the internal system, wherein the external access to the internal system is only performable via the input/output interface.

2. The system according to claim 1, further comprising an information module, connected to the testing module, for outputting messages of the testing module.

3. The system according to claim 1, wherein the data exchange for testing the authentication features or the integrity securing features is protected between the testing module and one of the respective system components by digital signatures or MACs (Message Authentication Codes) and/or encryption.

4. The system according to claim 1, wherein the testing module is implemented in order to test the associated integrity securing feature for a software imported into the system via an input/output interface of the testing module, wherein the software is digitally signed and protected and/or encrypted and transferred to one of the system components.

5. The system according to claim 3, wherein the internal digital signature arid/or the MAC-securing and/or encrypting is performed self-sufficient within the system.

6. The system according to claim 1, wherein in an initializing step the authentication features of the hardware modules of the system components are created in the system.

7. The system according to claim 1, wherein the authentication feature of a hardware module in a system component is the serial number of the hardware module and/or wherein the integrity securing feature of a software module in a system component is a digital signature generated using a public key method or an integrity code generated by a trusted entity.

8. The system according to claim 1, implemented as a system for a remote query of electricity meter readings, as a database server with accesses via clients, as a client/server configuration comprising internal data exchange, as a system for a remote setting of devices, as a system for a remote inquiry of account balances or as a system in a vehicle having networked processors/microcontrollers, in particular motor control, alarm system or central door safety system.

9. A networked system comprising:

an internal system bus;

a first remotely located system component and a second remotely located system component, the first and the second system components being remotely located from each other, the first remotely located system component and the second remotely located system component each comprising a hardware module and the first remotely located system component and the second remotely located system component being connected via the internal system bus;

wherein each of the first remotely located system component and the second remotely located system component stores an authentication feature for a hardware module;

an internal central testing module attached to the internal system bus and connected to the first remotely located system component and the second remotely located system component only via the internal system bus, the internal central testing module being adapted to centrally test the authentication features, the testing including a data exchange between the internal testing module and a respective remotely located system component wherein the internal central testing module has stored the authentification features from the first remotely located system component and the second remotely located system component and wherein the internal central testing module is implemented to centrally test the authentication features stored in the first remotely located system component and the second remotely located system component by using the authentication features of each of the first remotely located system component and the second remotely located system component stored in the internal central testing module in response to a request from the internal central testing module, a request from the first remotely located system component or from the second remotely located system component, powering down or switching off the internal system, or in specific time intervals during operation, and an input/output interface for accessing data and functions of the internal system from an external entity having access rights, the internal system comprising the internal system bus, the first and the second remotely located system components and the internal testing module, wherein the input/output interface is implemented within the internal central testing module, wherein the input/output interface forms the only external accessing possibility to the internal system, and wherein the internal central testing module is further implemented in order to perform an authentication of the external entity performing an external access and a testing of the access rights of the external entity performing an external access to the internal system, wherein the external access to the internal system is only performable via the input/output interface.

10. A networked system comprising:

an internal system bus;

a first remotely located system component and a second remotely located system component, the first and the second system components being remotely located from each other, the first remotely located system component and the second remotely located system component each comprising software modules and being connected via the system bus;

wherein each of the first remotely located system component and the second remotely located system component stores an integrity securing feature for a software module;

an internal central testing module attached to the internal system bus and connected to the first remotely located system component and the second remotely located system component only via the internal system bus, the internal central testing module being adapted to centrally test the integrity securing features, the central testing including a data exchange between the internal central testing module and a respective remotely located system component wherein the internal central testing module has stored the integrity securing features from the first remotely located system component and the second remotely located system component and wherein the internal central testing module is implemented to centrally test the integrity securing features stored in the first remotely located system component and the second remotely located system component by using the integrity security features of each system component stored in the internal central testing module in response to a request from the internal central testing module, a request from the first remotely located system component or from the second remotely located system component, powering down or switching off the internal system, or in specific time intervals during operation, and an input/output interface for accessing data and functions of the internal system from an external entity having access rights, the internal system comprising the first and the second remotely located system components and the internal central testing module, wherein the input/output interface is implemented within the internal central testing module, wherein the input/output interface forms the only external accessing possibility to the internal system, and wherein the internal central testing module is further implemented in order to perform an authentication of the external entity performing an external access and a testing of the access rights of the external entity performing an external access to the internal system, wherein the external access to the internal system is only performable via the input/output interface.

* * * * *